United States Patent Office 2,697,113
Patented Dec. 14, 1954

2,697,113

METHOD OF REMOVING PROTEIN FROM FATTY TISSUE

Albert J. Kramer, Arlington, Va.

No Drawing. Application January 26, 1951,
Serial No. 208,083

2 Claims. (Cl. 260—412.6)

This is a continuation-in-part of my application for patent Serial Number 207,060 filed January 20, 1951.

In said application, I have disclosed a method for the reduction of fat in which the raw fat or fatty tissue is first partially rendered, such as by the Pavia Process, to produce an oil slurry of the protein tissue and then reducing the tissue to a pulp in the slurry, followed by separation of the pulp from the oil. More specifically, the method comprises the steps of comminuting the fatty tissue and then heating the comminuted tissue to a temperature above about 140° F., but below the boiling point of water, to liquefy the fat in the comminuted tissues, and then mechanically pulping the hot comminuted tissue to a non-cellular, fibrous state, followed by separation of the liquid fat.

This method, while achieving a sharp reduction in the fat content of the protein residue, does not afford a complete separation of the fat and protein. I have now found a method of achieving a complete separation of the fat and protein. The method comprises placing the pulp residue from the oil slurry in water having a temperature above the melting point of the fat. The pulp residue has a specific gravity greater than water and sinks to the bottom. The oil has a specific gravity less than water and floats to the top, thus effecting a complete or nearly complete separation of these two elements. The fat which floats on top can be removed by skimming or decanting in the liquid state, or it can be permitted to solidify and harden, in which condition it may be removed in the form of a cake.

The pulp is separated from the water by any known method, such as filtering, centrifuging, settling tables, etc. It may also be purified by repeated washings with water. It may be used in this form or in a dehydrated form for many purposes, including those set forth in my application for patent referred to above.

If desired, the pulp slurry may be placed in the hot water without filtering, thereby effecting the complete separation in one step instead of two.

My invention also includes the formation of a slurry of unrendered raw fat with oil, the combined temperature being above the melting point of both the oil and the unrendered fat, then reducing the protein of the unrendered fat to a pulp and separating the pulp from the oil by any of the procedures described above. The oil for making the slurry may be either from a previously rendered batch of the same or of a different kind of fat or it may be an entirely different type of oil, such as vegetable or mineral oil. For example, where a shortening is to be made using, say, 15% hydrogenated vegetable oil and 85% animal fat, the 15% vegetable oil may be used to make the slurry so that the final product will be a blended shortening containing these ingredients in the desired proportions.

Having thus described by invention, I claim:

1. In the rendering of fat from cellular fatty tissue wherein the tissue is first comminuted, then heated to a temperature above 140° F. and below the boiling point of water to liquefy the fat in the comminuted tissues, and then mechanically pulped to a non-cellular fibrous state; the method of separating the liquid fat from the pulp, said method comprising placing the pulp in water at a temperature above the melting point of the fat and below the boiling point of the water, permitting the pulp to settle in the water and the fat to float to the surface of the water, then separating the floating fat from the water and removing the water from the settled pulp.

2. In the rendering of fat from cellular fatty tissue wherein the tissue is first comminuted, then heated to a temperature above 140° F. and below the boiling point of water to liquefy the fat in the comminuted tissues, and then mechanically pulped to a non-cellular fibrous state; the method of separating the liquid fat from the pulp, comprising placing the pulp in water at a temperature above the melting point of the fat and below the boiling point of water, permitting the pulp to settle in the water and the fat to float to the surface of the water, cooling the water to solidify the fat, removing the solidified fat from the water, and separating the water from the settled pulp.

References Cited in the file of this patent

UNITED STATES PATENTS

| Number | Name | Date |
|---|---|---|
| 137,698 | Marshall | Apr. 8, 1873 |
| 705,034 | Cameron | July 22, 1902 |
| 2,467,529 | Hormel | Apr. 19, 1949 |
| 2,468,636 | Napier | Apr. 26, 1949 |